United States Patent [19]

Thoma et al.

[11] Patent Number: 4,588,761

[45] Date of Patent: May 13, 1986

[54] COATING COMPOSITIONS CONTAINING SOLVENTS AND CROSSLINKING AGENTS AND THEIR USE FOR HEAT-ACTIVATED ONE-COAT REVERSE COATING

[75] Inventors: Wilhelm Thoma, Leverkusen; Josef Pedain, Cologne; Walter Schröer, Leverkusen; Waldemar Kling, Kuerten, all of Fed. Rep. of Germany

[73] Assignee: Bayer Aktiengesellschaft, Leverkusen, Fed. Rep. of Germany

[21] Appl. No.: 599,027

[22] Filed: Apr. 11, 1984

[30] Foreign Application Priority Data

Apr. 13, 1983 [DE] Fed. Rep. of Germany ....... 3313236

[51] Int. Cl.⁴ .......................... C08L 1/10; C08L 1/14; C08L 75/06; C08L 75/08
[52] U.S. Cl. ....................................... 524/38; 524/37; 524/39; 524/500; 524/539; 524/542; 524/589
[58] Field of Search .................. 524/37, 39, 542, 539, 524/589, 210, 38, 500, 233, 211

[56] References Cited

U.S. PATENT DOCUMENTS

| 3,627,719 | 12/1971 | Saddl ..................... 524/542 |
| 3,748,291 | 7/1973 | Bhakuni et al. .................... 524/542 |
| 3,862,261 | 1/1975 | Stoddard ........................ 524/542 |
| 3,904,796 | 9/1975 | Zorn et al. ........................ 524/390 |
| 3,959,049 | 5/1976 | Tanaka et al. ....................... 156/79 |
| 4,157,359 | 6/1979 | Chang et al. ...................... 260/849 |
| 4,206,255 | 6/1980 | Wenzel et al. ................. 427/393.5 |

FOREIGN PATENT DOCUMENTS 49-30719 8/1974 Japan .................................. 524/542

Primary Examiner—Allan M. Lieberman
Attorney, Agent, or Firm—Gene Harsh; Joseph Gil; Thomas W. Roy

[57] ABSTRACT

This invention relates to PU-coating compositions containing solvent and combinations of crosslinking agents and to a process for producing polyurethane coatings on the principle of heat-activated, one-coat reverse coating by knife-coating the polyurethane coating composition onto a temporary support, drying the layer and laminating the textile substrates using preferably heated pressure rollers, followed by heating at elevated temperatures, the coating compositions used being solvent-containing, 20 to 60% compositions of a polyurethane mixture I containing (A) relatively soft polyurethanes and
(B) relatively hard one-component polyurethanes and a crosslinker combination II containing
(C) formaldehyde-urea and/or formaldehyde-melamine resins and crosslinking catalysts and
(D) aliphatic and/or aromatic polyisocyanates, particularly blocked polyisocyanates, and, optionally, additions of soluble cellulose esters, handle-improving agents, optionally polysiloxanes containing oxyalkylene groups and other standard additives, such as pigments.

The heat-active one-coat reverse coatings obtained in this way show surprisingly high dry and wet adhesion values on textile substrates through the mixed crosslinking of the selected polyurethane mixtures and, hence, high article fastness values.

4 Claims, No Drawings

COATING COMPOSITIONS CONTAINING SOLVENTS AND CROSSLINKING AGENTS AND THEIR USE FOR HEAT-ACTIVATED ONE-COAT REVERSE COATING

BACKGROUND OF THE INVENTION

1. Field of the Invention

This invention relates to PU-coating compositions containing solvent and combinations of crosslinking agents and to a process for producing polyurethane coatings on the principle of heat-activated, one-coat reverse coating by knife-coating the polyurethane coating composition onto a temporary support, drying the layer and laminating the textile substrate using preferably heated pressure rollers, followed by heating at elevated temperatures, the coating compositions used being solvent-containing, 20 to 60% compositions of a polyurethane mixture I containing
  (A) relatively soft polyurethanes and
  (B) relatively hard one-component polyurethanes and a crosslinker combination II containing
  (C) formaldehyde-urea and/or formaldehyde-melamine resins and crosslinking catalysts and
  (D) aliphatic and/or aromatic polyisocyanates, particularly blocked polyisocyanates,
and, optionally, additions of soluble cellulose acyl esters, handle-improving agents, optionally polysiloxanes containing oxyalkylene groups and other standard additives, such as pigments.

The heat-activated, one-coat reverse coatings obtained in this way show surprisingly high dry and wet adhesion values on textile substrates through the mixed crosslinking of the selected polyurethane mixtures and, hence, high article fastness values.

2. Description of the Prior Art

The production of artificial leather for various applications, such as outer clothing, shoe upper material or suitcase material, from polyurethane starting materials by the transfer process is already known. In general, the artificial leather is made up of two different layers, namely the surface layer and the adhesion layer. In general, from 20 to 50 g/m$^2$ of solids are applied per layer. The starting materials used are solutions of one-component and also two-component polyurethanes or polyurethane dispersions. The two-component polyurethanes only receive their final plastic-like character through crosslinking with polyisocyanates.

A more recent technique for coating web-form textiles is the so-called heat-activated, one-coat reverse coating process. In this process, the coating paste is knife-coated onto a temporary support, for example a release paper, the solvent (mixture) is evaporated off, the textile substrate is laminated onto the dry, heat-activated polyurethane film using a heated pressure roll and the polyurethane film subsequently crosslinked at elevated temperature. The advantages of heat-activated, one-coat reverse coating lie in the low spread possible, for example from 15 to 30 g/m$^2$, thereby enabling light coatings to be obtained. One particularly interesting aspect of this process is that it is possible to use substrates which are unsuitable or less suitable for solvent coating or for direct coating either on account of their constructions or on account of their dissolving properties (for example polyacrylate substrates or so-called PU-coagulates). Particularly light or open-mesh fabrics may also be coated without any danger of lamination failures.

Disadvantages of heat-activated, one-coat reverse coating process center above all around the adhesion problems experienced with articles produced by that process. The adhesion values vary and the wet adhesion values in particular are relatively poor.

Accordingly, the object of the present invention was to provide a composition for the heat-activated, one-coat reverse coating process which shows improved properties and, more particularly, improved adhesion of the articles produced by that process. According to the invention, this object is achieved by reacting a special polyurethane composition with a combination of formaldehyde crosslinkers and polyisocyanate crosslinkers, preferably blocked polyisocyanates.

SUMMARY OF THE INVENTION

The composition according to the invention of the polyurethane coating composition containing solvents and combinations of crosslinking agents for producing polyurethane coatings on sheet-form textiles by one-coat reverse coating is characterized in that the compositions which contain from about 20 to 60% and, more particularly, from about 30 to 50% of solids in organic solvents contain in their solids the following components (I) from about 60 to 97.5 parts of a polyurethane mixture of
  (A) from about 60 to 90% by weight, preferably from about 70 to 80% by weight, based on I of a relatively soft, substantially linear polyurethane of only moderately high molecular weight and
  (B) from about 10 to 40% by weight and preferably from about 20 to 30% by weight of a high molecular weight, relatively hard one-component polyurethane,
(II) from about 2.5 to 15 parts, preferably from about 4 to 10 parts of a crosslinker combination of
  (C) from about 10 to 60% by weight, preferably from about 40 to 80% by weight, based on II, of formaldehyde resins, preferably formaldehyde-urea and/or melamine-crosslinker resins, and crosslinking catalysts and
  (D) from about 40 to 90% by weight, preferably from about 20 to 60% by weight, of aliphatic and/or aromatic blocked or unblocked polyisocyanates, preferably blocked aromatic polyisocyanates containing at least two isocyanate functions.

The present invention also relates to the use of the above-mentioned polyurethane coating compositions for producing polyurethane coatings using the heat-activated, one-coat reverse coating process by application to a temporary support, drying the layer and laminating the textile substrate using preferably heated pressure rollers, followed by heating at elevated temperatures.

DETAILED DESCRIPTION OF THE INVENTION

The coating compositions may additionally contain:
(III)
  (E) from 0 to about 10 parts, preferably from about 0.1 to 5 parts, of cellulose acyl esters,
  (F) from 0 to about 5 parts, preferably from about 0.3 to 3 parts, of handle-improving agents, (G) from 0 to about 5 parts, preferably from about 0.1 to 3.5 parts, of silicones and (H) from 0 to about 20 parts of pigments, fillers, stabilizers and other additives.

The parts are indicated by weight.

The advantages of the process according to the invention for producing light polyurethane coatings by heat-activated, one-coat reverse coating arise out of the mixed crosslinking of the polyurethane mixture with formaldehyde resins and/or polyisocyanates (in blocked or unblocked form). High dry and wet adhesion values are advantageously obtained which in turn leads to good article fastness values, for example to outstanding resistance to washing and dry cleaning, abrasion resistance and folding resistance.

The high adhesion values obtained when the polyurethane compositions of the two-component and one-component polyurethanes are crosslinked with mixtures of formaldehyde resins and polyisocyanates are surprising and had not been expected in the light of the results obtained with the individual crosslinking agents.

The polyurethane component (A) of the polyurethane mixture (I) contains relatively soft polyurethanes of only moderately high molecular weight which only obtain a high molecular weight structure and high-order polyurethane properties through additional crosslinking with polyisocyanates (so-called two-component polyurethanes). They are synthesized from relatively high molecular weight polyhydroxyl compounds having a molecular weight in the range from about 600 to 6000 and preferably in the range from about 800 to 4000, aromatic and/or (cyclo) aliphatic polyisocyanates and from about 0 to about 1.5 moles of chain extending agents per mole of relatively high molecular weight polyhydroxyl compound, preferably from about 0.2 to 1.0 mole of chain extending agents such as dialcohols, aminoalcohols, diamines, hydrazine hydrate and/or dihydrazide compounds. An NCO/XH-ratio (XH are the isocyanate-reactive groups containing active hydrogen atoms) of preferably <0.98:1 and, more particularly, of <0.96:1 is maintained during the reaction or an NCO-excess is removed by monofunctional chain terminators. The reaction may be carried out in the melt, preferably in multiple-screw reaction extruders, or in solution.

Component (B) of the polyurethane mixture I contains high molecular weight, relatively hard polyurethanes which, even without additional crosslinking, show high-order polyurethane properties and greater hardness and a higher softening range coupled with reduced solubility (so-called one-component polyurethanes). They are synthesized from the same components as polyurethane component (A), except that more than 1.5 and up to about 6 moles, preferably from about 1.7 to 5.2 moles, of bifunctional chain-extending agents of the type mentioned for (A) are used per mole of relatively high molecular weight polyhydroxyl compound. It is preferred to use substantially equivalent quantities or, optionally, slight excesses of NCO-relative to XH-groups, i.e., in general an NCO/XH-ratio of from $\geq 0.98:1$ to about 1.08:1 and preferably from 1.04:1 to 1.05:1.

The reaction components for polyurethanes (A) or (B) are the known compounds which are normally used in polyurethane chemistry and which have been repeatedly described.

The relatively high molecular weight polyhydroxyl compounds are, preferably, dihydroxy polyesters, dihydroxy polylactones, dihydroxy polycarbonates and dihydroxy polyethers or mixtures or mixed condensates thereof.

Preferred polyisocyanates are aromatic and/or (cyclo)aliphatic diisocyanates, for example the isomeric tolylene diisocyanates, diphenyl-4,4'-diisocyanates, diphenylmethane-4,4'-/2,4'- and/or 2,2'-diisocyanates, 3,3'-dimethyldiphenyl-4,4'-diisocyanate, hexamethylene diisocyanate, lysine ester diisocyanate, isophorone diisocyanate, dicyclohexylmethane-4,4'-2,4'- and/or -2,2'-diisocyanates in the form of their stereoisomers or mixtures of these diisocyanates.

The chain-extending agents used are, in particular, 1,4-butane diol, 2,3-butane diol, 1,3-butane diol, ethylene glycol, 2,2-dimethylpropane diol, hydroquinone-bis-(2-hydroxyethyl)-ether, terephthalic acid bis-(2-hydroxyethyl)-ester or even diamines, such as ethylene diamine, hexane diamine, isophorone diamine, dicyclohexylmethane-4,4'-diamine or also hydrazine hydrate, terephthalic acid dihydrazide or β-semicarbazido-propionic acid hydrazide.

The solvents used for the polyurethanes are dimethyl formamide, dimethylacetamide, N-methyl pyrrolidone, N-methyl acetamide and other amide- and/or urea-containing solvents, but preferably dimethyl formamide, also tetrahydrofuran or dioxane and ketones, such as methylethyl ketone, or esters, such as ethyl acetate.

It is preferred to use mixtures of highly polar solvents, such as for example dimethyl formamide, and less polar solvents, such as methylethyl ketone or ethyl acetate, and optionally aromatic hydrocarbons, for example toluene or xylene. In certain cases, it is also possible to use mixtures of aromatic hydrocarbons and low molecular weight alcohols, for example toluene and isopropanol, as solvent.

The relatively low molecular weight two-component polyurethanes (A) are generally processed as solutions containing about 30 to 60% solids and the relatively high molecular weight one-component polyurethanes as solutions containing about 20 to 40% solids.

The formaldehyde resins (C) of the crosslinker combination preferably emanate from formaldehyde-urea and/or formaldehyde-melamine resins of which the methylol groups may optionally be completely or partly etherified with alcohols, for example with methanol or butanols. Melamine alkanol ethers are preferred. The resins may be used in solvent-free form or in solution in water or in alcohols, such as methanol, butanol, isobutanol or others. The concentration of these resin solutions is generally between about 40 and 80% solids by weight.

The polyisocyanates (D) of the crosslinker combination are aliphatic and/or aromatic polyisocyanates and/or blocked aromatic polyisocyanates which contain at least two NCO-functions and preferably three or more NCO-functions. The blocked or unblocked polyisocyanates may be used in solvent-free form or in the form of solutions containing about 30 to 80% solids, more particularly, about 50 to 75% solids. Suitable blocking agents for the polyisocyanates are ketoximes, such as for example methylethyl ketoxime or diisobutyl ketoxime; H-acid esters, such as malonic ester or acetoacetic ester; phenols such as, for example, phenol or nonylphenol; and other blocking agents, such as caprolactam. Polyisocyanates of the type mentioned are, inter alia, biuretized, optionally uretdione-containing polyisocyanates of aliphatic or cycloaliphatic diisocyanates such as hexane diisocyanate and/or isophorone diisocyanate, isocyanurates of hexane diisocyanate, isophorone diisocyanate, tolylene-2,4-/2,6-diisocyanate or, optionally, mixtures of polyisocyanates. It is also possible to use reaction products of trimethylol propane, glycerol, pentaerythritol or other polyols in admixture with dialcohols, such as diethylene glycol, 1,4-butane diol, dipropylene glycol and other diols, with molar excesses of tolylene diisocyanates, diphenylmethane diisocyanates or their isomer mixtures and also reaction products of dialcohols, such as diethylene and triethylene glycol, dipropylene and tripropylene glycol, with molar excesses of tolylene diisocyanates or diphenyl methane diisocyanates, either individually or in admixture.

The cellulose acyl esters (E) used are cellulose acyl alkyl esters and mixed acyl alkyl esters, preferably cellulose acetobutyrates.

Handle-improving agents (F) are used as further additives in the compositions according to the invention. Agents such as these are long-chain, saturated and unsaturated fatty acid amides, fatty acid esters, urethanes or ureas with long-chain fatty acid residues and similar compounds. Examples are stearic acid amide, erucic acid amide, erucic acid-N-2-hydroxyethylamide, erucic acid-N-[bis-2-hydroxyethyl]-amide, stearic acid isobutyl ester, erucic acid hydroxyethyl ester, ethylene glycol-bis-stearic acid ester, 1,3-propylene glycol-bis-erucic acid ester, 1,2-propylene-bis-stearic acid amide and other compounds. It is also possible to use finely disperse polymers having particle sizes of <10 μm, for example polyolefin powders, such as polyethylene or polypropylene powders, powder-form polyacrylates of acrylic and methacrylic acid acrylesters, optionally mixtures with acrylonitrile, acrylamide, N-methylol acrylamide, N-methylene oxyalkylethers, acrylamides, styrene, divinylbenzene; powder-form-polyamides of polyamide-6,6, polyamide-6, polyamide-11 and powder-form aromatic polyesters, for example terephthalic acid esters, particularly polyethylene glycol terephthalate. Natural and synthetic waxes are also suitable.

Further additives in the composition are silicones (G), for example toluene-soluble polydimethyl polysiloxanes which, solvent-free, have viscosities of from about 100 to 50,000 mPas/25° C. and, more particularly, from about 500 to 5000 mPas/25° C. Other silicones are organofunctional silicones, for example silicones containing terminal hydroxyalkyl groups, which are soluble in water or other polar solvents, such as alcohol or dimethyl formamide. In addition, the silicones may be dispersed in water. Other suitable silicone derivatives are the polyoxyalkylene polydimethyl siloxanes (polyether silicones) which contain oxyalkylene segments in addition to dimethyl siloxane segments in a linearly alternating, branched or comb-like structure.

The polyurethane compositions may also contain standard additives (H), for example pigments, fillers, dyes, hydrolysis and light stabilizers, oxidation inhibitors, plasticizers, flameproofing agents, fungicides and similar additives.

The described polyurethane coating compositions are used in the heat-activated, one-coat reverse coating process by applying the coating solutions to a temporary support (for example (silicone) release papers or (silicone) stencils which may optionally be patterned as required), drying the layer at elevated temperatures, preferably continuously in a drying tunnel heated to temperatures of up to about 120° C. and preferably to temperatures of from about 60° to 80° C., or by infrared heating, laminating the textile substrate using pressure rollers heated to between about 20° and 160° C. and preferably to between about 80° and 125° C., followed by heating at elevated temperatures, preferably in the range from about 120° to 180° C.

The process is preferably carried out continuously using coating machines equipped with appropriate feed systems, coating knives, heating and pressure cylinders and drying tunnels between about 2 and 12 meters long and preferably between 4 and 7 meters long.

The quantities of composition applied to the textile substrate normally amount to between about 12 and 50 $g/m^2$ and preferably between about 15 and 30 $g/m^2$, expressed as solids. At the end of the process, the coating is separated from the temporary support (release paper).

The invention is further illustrated, but is not intended to be limited by the following examples in which all parts and percentages are by weight unless otherwise specified.

EXAMPLES

EXAMPLE 1

The PUR-composition for producing a one-coat transfer coating by the heat-activated process had the following composition:

| | |
|---|---|
| 600 g of A: | a 50% PUR—solution in dimethyl formamide (DMF), methyl ethyl ketone (MEK), toluene (TOL) (2:1:1), 20,000 mPas/25° C. 1000 g (0.5 mole) of ethylene glycol polyadipate and 1000 g (0.5 mole) of diethylene glycol polyadipate were reacted in the melt at 100° C. with 230 g (1.32 moles) of tolylene-2,4/2,6-diisocyanate (80:20 isomer mixture) to form an NCO—prepolymer; after additions of 1130 g of DMF, 565 g of MEK, 565 g of TOL and 31.8 g (0.30 mole) of diethylene glycol, the polyaddition reaction was continued in solution at 80° C.; any further increase in the viscosity of the PUR—solution was stopped by the addition of 1.5 g of N—methyl ethanolamine. |
| 300 g of B: | a 30% one-component polyurethane solution in DMF/MEK 2:1, 25,000 mPas/25° C.; 2000 g (1.0 mole) of 1,4-butane diol adipate, 217 g (3.50 moles) of ethylene glycol and 1130 g (4.52 moles) of 4,4'-diphenylmethane diisocyanate were subjected to polyaddition at 80° C. in 5200 g of DMF; after the solution had been diluted with 2600 g of MEK, any further increase in viscosity was stopped by the addition of 2.5 g of dibutylamine. |
| 10 g of | cellulose acetobutyrate |
| 2 g of | erucic acid amide |
| 10 g of | ethoxylated dimethyl polysiloxane |
| 15 g of | liquid melamine resin, solvent-free (melamine hexamethylol ether) |
| 3 g of | a 30% catalyst solution (190 g of p-toluene sulfonic acid, 101 g of N—methyl morpholine, 709 g of DMF) |
| 10 g of | polyisocyanate, 75% in ethyl acetate, NCO—content approximately 13% [produced from trimethylol propane, 1,3-butane diol and tolylene-2,4/2,6-diisocyanate (65:35 isomer mixture)] |
| 50 g of | MEK |
| 1000 g | |

The PUR-composition had a solids content of 43% and a viscosity of 18,000 mPas/25° C.

Following the addition of 10% by weight of a paste containing 40% of $TiO_2$ in dioctyl phthalate, the PUR-composition was knife-coated in the form of a film onto a smooth, matt release paper (wet spread 70 g/m²). The solvent mixture was evaporated at 60° to 80° C. in the first tunnel of a tandem coating machine. The PUR-film was "heat-activated" and laminated with a PES-fabric (weight per square meter 120 g/m²) under a pressure of 5 bars using a roll heated to 120° C. installed between the first and second tunnels. During its passage through the second tunnel, 120°/140°/160° C., the PUR-system was crosslinked. A light, soft coated article characterized by a pleasantly supple handle was obtained (weight of coating only 25 g/m²). The dry and wet adhesion values obtained when the "crosslinker combination" of resin and polyisocyanate was used were considerably better than those obtained when the crosslinkers were used individually.

| Dry and wet adhesion in N/2.5 cm | | | |
|---|---|---|---|
| Crosslinker | | Dry adhesion | Wet adhesion |
| 1.5% of melamine resin | (comparison) | 12–15 | 8–10 |
| 2.5% of melamine resin | | 12–17 | 8–10 |
| 1.0% of polyisocyanate | (comparison) | 12–15 | 10–12 |
| 2.5% of polyisocyanate | | 15–18 | 10–15 |
| 1.5% of melamine resin 1.0% of polyisocyanate | (according to the invention) | 25–30 | 20–28 |

PES = polyester (polyethylene terephthalate)
PUR = polyurethane

EXAMPLE 2

The PUR-composition for producing a one-coat transfer coating had the following composition (concentration: 37.7%, viscosity: 8000 mPas/25° C.):

| | |
|---|---|
| 500 g of A: | a 50% PUR—solution in DMF, 40,000 mPas/25° C., prepared as follows: 810 g (0.90 mole) of 1,4-butane diol polyadipate, 170 g (0.10 mole) of a mixed polyadipate of 1,6-hexane diol/neopentyl glycol (7:3) and 45 g (0.50 mole) of 1,4-butane diol were subjected to polyaddition at 70–80° C. with 265 g (1.52 moles) of tolylene-2,4/2,6-diisocyanate (80:20 isomer mixture) in 1290 g of DMF. The reaction was stopped by the addition of 2.0 g of butanone oxime. |
| 300 g of B: | a 25% solution of a one-component polyurethane granulate in DMF (10,000 mPas/25° C.) prepared as follows: 1000 g (0.5 mole) of 1,4-butane diol polyadipate, 1000 g (0.5 mole) of 1,6-hexane diol polycarbonate, 270 g (3.0 moles) of 1,4-butane diol and 1000 g (4.0 moles) of 4,4'-diphenylmethane diisocyanate were subjected to polyaddition in the melt in a reaction extruder to form the polyurethane which was then granulated while cooling. |
| 10 g of | cellulose acetobutyrate |
| 4 g of | ethylene glycol fatty acid ester with a mixture of $C_{15}$–$C_{21}$-fatty acids |
| 10 g of | a 70% dispersion of a dimethyl polysiloxane in water |
| 20 g of | melamine resin, solvent-free (see example 1) |
| 3 g of | catalyst, 29% in DMF (as in Example 1) |
| 5 g of | polyisocyanate, NCO—content approximately 20% (biuretized, 1,6-hexane diisocyanate) |
| 10 g of | polyisocyanate, trimerized 1,6-hexane diisocyanate, blocked with butanone oxime, 70% in DMF, NCO—content approximately 10% |
| 138 g of | DMF |
| 1000 g | |

1000 g of this PUR-composition were pigmented with 100 g of a standard commercial pigment paste.*⁾ The composition was then knife-coated in the form of a film onto a release paper (wet spread 60 g/m²) and dried at 60° to 70° C. in the first tunnel of a coating machine. The PUR-film was heat-activated at 125° C. on a heatable steel roll between the first and second tunnels (residence time on the roll 5–6 seconds) and laminated under a pressure of 5 bars with a raised cotton fabric pretreated by coagulation with DMF-PUR-solution (so-called coagulate substrate). The polyurethane was crosslinked in 1.5 to 2 minutes at 150°–160° C. during its passage through the second tunnel. The article with a 20 g/m² PUR surface coating showed good grain stability and had a full, soft handle. The dry and wet adhesion values were excellent and amounted to 38N/2.5 cm and 35N/2.4 cm, respectively.

*⁾ (same as in example 1)

EXAMPLE 3

The PUR-composition for producing a one-coat transfer coating had the following composition (concentration: 40.0%, viscosity: 12,000 mPas/25° C.):

| | |
|---|---|
| 600 g of A: | a 45% two-component polyurethane solution in DMF (25,000 mPas/25° C.) prepared as follows: 720 g (0.90 mole) of 1,6-hexane diol polyadipate, 170 g (0.10 mole) of a mixed polyadipate of 1,6-hexane diol and neopentyl glycol (7:3), 48.0 g (0.54 mole) of 1,4-butane diol were reacted at 70–80° C. with 268 g (1.54 moles) of tolylene-2,4/2,6-diisocyanate (80:20 isomer mixture) in 500 g of DMF. Finally, the concentration was adjusted by the addition of another 980 g of DMF and the polyaddition reaction completed by the addition of 3.0 g of butanone oxime. |
| 80 g of B: | PUR—granulate, based on a one-component polyurethane prepared as follows: 1000 g (0.5 mole) of 1,4-butane diol polyadipate, 113 g (1.25 moles) of 1,4-butane diol, 78.0 g (1.25 moles) of ethylene glycol and 750 g (3.0 moles) of 4,4'-diphenylmethane diisocyanate were subjected to polyaddition in the melt in a reaction extruder to form the polyurethane which was then granulated while cooling. A 25% solution of the PUR in DMF/TOL/MEK (1:1:1) had a viscosity of 10,000 mPas at 25° C. |
| 12 g of | cellulose acetobutyrate |
| 4 g of | polyethyl acrylate powder, crosslinked |
| 16 g of | ethoxylated dimethyl polysiloxane (50% in toluene) |
| 25 g of | melamine resin (as in Example 1) 70% in isobutanol |
| 10 g of | blocked polyisocyanate (isocyanurate of 1,6-hexane diisocyanate (1.0 mole) and tolylene-2,4/2,6-diisocyanate (65:35 isomer mixture) (2.0 moles) blocked with a mixture of malonic acid diethyl ester/acetoacetic acid ethyl ester (2:1), 50% in butyl acetate, ethyl glycol acetate, xylene, NCO—content approximately 8%. |
| 3 g of | a catalyst solution having the following composition: 190 g of p-toluene sulfonic acid, 149 g of triethanolamine, 661 g of DMF |
| 125 g of | toluol, |
| 125 g of | methyl ethyl ketone |
| 1000 g | |

After the PUR-composition had been pigmented with 10% of a standard commercial pigment paste according to Example 1, a surface coat on release paper (dry spread 20 g/m²) was laminated with a 1000 g/m² spun-rayon fabric by the heat-activated process described in Examples 1 and 2 and crosslinked by heating. A light outer-clothing article having a pleasantly smooth handle and excellent dry adhesion (30N/2.5 cm) and wet adhesion (25N/2.5 cm) values was obtained.

In another embodiment, the surface coat dried at 50°–60° C. in the first tunnel of the coating machine and was laminated with the above-mentioned spun-rayon fabric at 20° C. on a steel cylinder (contact pressure 5 to 6 bars). Crosslinking took place in 1.5 to 2 minutes at 150° to 160° C. during passage through the second drying tunnel.

EXAMPLE 4

PUR-composition for one-coat transfer coating (heat activation)
Concentration: approximately 55%
Viscosity: 18,000 mPas/25° C.

| | |
|---|---|
| 700 g of A: | a 50% aliphatic two-component polyurethane solution in toluene/isopropanol/ethyl glycol = 45:35:20, 40,000 mPas/25° C., prepared as follows: 2000 g (1.0 mole) of diethylene glycol polyadipate, 285 g (1.29 moles) of isophorone diisocyanate and 65 g (0.39 mole) of hexane diisocyanate were reacted at 100–110° C. in 1070 g of toluene to form an NCO—prepolymer. After cooling to 20–25° C., a solution of 34.0 g of hydrazine hydrate in 830 g of isopropanol was run into the prepolymer solution with thorough stirring. The PUR—urea solution underwent a rapid increase in viscosity and was diluted with 475 g of ethyl glycol; the reaction was stopped by the addition of 2 g of diethanolamine. |
| 150 g of B: | aliphatic one-component polyurethane granulate 1000 g (0.5 mole) of 1,4-butane diol polyadipate and 300 g (1.35 moles) of isophorone diisocyanate were reacted in the melt in a reaction extruder to form a prepolymer. Following the introduction of 178 g (0.85 mole) of 4,4'-diamino-dicyclohexyl methane, the polyurethane urea was synthesized in the melt, followed by extrusion, cooling and granulation. A 25% solution of the granulate in toluene/isopropanol/ethyl glycol had a viscosity of 12,000 mPas at 25° C. |
| 10 g of | cellulose acetobutyrate in the form of a 50% solution in MEK |
| 10 g of | polyethylene powder |
| 10 g of | dimethyl polysiloxane in the form of a 50% solution in TOL |
| 25 g of | melamine resin (same as in Example 1) in the form of a 70% solution in isobutanol |
| 10 g of | blocked polyisocyanate isocyanurate of hexane-1,6-diisocyanate blocked with a mixture of malonic acid diethyl ester and acetoacetic acid ethyl ester (2:1), 75% in ethyl glycol acetate/xylene (3:2), NCO—content approximately 10% |
| 5 g of | catalyst (as in Example 3) |
| 40 g of | toluene |
| 40 g of | ethyl glycol |
| 1000 g | |

Dyed PES/cotton fabric (weight per square meter 120 g/m²) was laminated by the heat-activated transfer process with an unpigmented surface-coat film of the above PUR-composition (spread 20 g/m²) and crosslinked. A light coated article optically characterized by the dyed fabric was obtained, being distinguished by its fastness to light and its pleasantly smooth handle. Dry adhesion: 35N/2.5 cm, wet adhesion: 28N/2.5 cm.

EXAMPLE 5

PUR-composition for one-coat transfer coating (heat activation)
Concentration: approximately 46%
Viscosity: 15,000 mPas/25° C.
Composition:

| | |
|---|---|
| 650 g of A: | a 50% polyurethane urea solution in DMF/TOL/IPA (isopropyl alcohol) = 50:30:20; 35,000 mPas/25° C.; prepared as follows: 2000 g (1.0 mole) of dihydroxypropylene glycol polyether were reacted in the melt at 100° C. with 295 g (1.70 moles) of tolylene-2,4/2,6-diisocyanate (80:20 isomer mixture) to form an NCO—prepolymer. After the prepolymer had been dissolved in 710 g of toluene and 1000 g of DMF, 37.5 g (0.5 mole) of N—methyl ethanolamine in 180 g of DMF were added at 40° C. and the mixture subjected to polyaddition at 80° C. A solution of 34.0 g (0.2 mole) of isophorone diamine in 475 g of isopropanol was then stirred in at 20 to 30° C. The polyaddition reaction was stopped by the addition of 3.0 g of butanone oxime. |
| 275 g of B: | a 30% aliphatic PUR—urea solution in DMF/TOL/IPA = 50:25:25, 12,000 mPas/25° C.; prepared as follows: 2000 g (1.0 mole) of dihydroxy-oxytetra-methylene polyether, 135 g (1.5 moles) of 1,4-butane diol and 820 g (3.7 moles) of isophorone diisocyanate were reacted in the melt at 100 to 110° C. to form an NCO—prepolymer. After dissolution in 3500 g of DMF and 1750 g of TOL, a solution of 103 g (1.20 moles) of piperazine in 1750 g of isopropanol was added at 20° C. The polyaddition reaction was ultimately stopped by the addition of 3 g of propanolamine. |
| 10 g of | cellulose acetobutyrate in DMF, 50% |
| 10 g of | polyamide powder (of polyamide-6,6) |
| 10 g of | dimethyl polysiloxane in toluene, 50% |
| 25 g of | melamine resin, solvent-free (same as in example 1) |
| 15 g of | blocked polyisocyanate of tripropylene glycol (1.0 mole) 4,4'-diphenylmethane diisocyanate (5.0 moles) and butanone oxime (8.0 moles), 50% in MEK/ethylglycol acetate (1:1), NCO—content approximately 10%. |
| 5 g of | a 53% catalyst solution in DMF containing 19.0 g of p-toluene sulfonic acid, 34.0 g of N—methyl stearyl-β-oxypropyl amine and 47 g of DMF. |
| 1,000 g | |

10% of a commercially available pigment paste (same as in example 1) and 2% of finely disperse silica as matting agent were stirred into the PUR composition.

A heat-activated surface coat (25 g/m²) was formed on release paper and laminated with a bi-elastic knitted fabric of polyacrylic fiber (150 g/m²) by the same method as described in the preceding Examples. The article obtained had a full, pleasantly dry handle. Dry adhesion: 25N/2.5 cm, wet adhesion: 23N/2.5 cm.

Although the invention had been described in detail in the foregoing for the purposes of illustration, it is to be understood that such detail is solely for that purpose and that variations can be made therein by those skilled in the art without departing from the spirit and scope of the invention except as it may be limited by the claims.

What is claimed is:

1. A polyurethane coating composition having a solids content of from about 20 to 60% by weight in at least one organic solvent wherein the solids comprise:
   (I) from about 60 to 97.5 parts, based on I, of a polyurethane mixture of
      (A) from about 60 to 90% by weight, based on I, of a relatively soft, substantially linear polyurethane of moderately high molecular weight based on
         (a) hydroxy polyesters and/or polyethers having a molecular weight of about 600 to 6000,
         (b) from 0 to about 1.5 moles, based on (a), of a chain-extending agent comprising a member selected from the group consisting of dialcohols, amino-alcohols, diamines, hydrazine hydrate, dihydrazide compounds and mixtures thereof, and
         (c) aromatic and/or aliphatic polyisocyanates,
      (B) from about 10 to 40% by weight, based on I, of a high molecular weight, relatively hard one-component polyurethane based on
         (a) hydroxy polyesters and/or polyethers having a molecular weight of about 600 to 6000,
         (b) from about 1.5 to 6 moles, based on (a), of a chain-extending agent selected from the group consisting of dialcohols, amino alcohols, diamines, hydrazine hydrate, dihydrazide compounds and mixtures thereof and
         (c) aromatic and/or aliphatic polyisocyanates,
   (II) from about 2.5 to 15 parts of a crosslinker combination of
      (C) from about 10 to 60% by weight, based on II, of formaldehyde-urea and/or formaldehyde-melamine resins and
      (D) from about 40 to 90% by weight of aliphatic and/or aromatic, unblocked or blocked polyisocyanates containing at least two isocyanate functions and
   (III) said coating composition additionally containing
      (E) from about 0.1 to 5 parts of cellulose acyl esters and mixed acyl alkyl esters,
      (F) from about 0.3 to 3 parts of handle-improving agents,
      (G) from 0 to about 5 parts of silicones and
      (H) from 0 to about 20 parts of pigments, fillers and stabilizers.

2. The polyurethane coating composition of claim 1 wherein I is a polyurethane mixture of about 70 to 80% by weight of (A) and about 20 to 30% by weight of (B) and II is a crosslinker combination of about 40 to 80% by weight of (C) and about 20–60% by weight of (D).

3. The polyurethane coating composition of claim 1 wherein II contains from about 4 to 10 parts of a crosslinker combination of
   (C) about 40 to 80% by weight, based on II, of formaldehyde-urea and/or melamine/alkanol ethers and
   (D) from about 20 to 60% by weight, based on II, of aliphatic and/or aromatic polyisocyanates containing at least two isocyanate functions and blocked with H-acid esters and/or oximes.

4. The polyurethane coating composition of claim 1 which additionally contains
   (E) from about 0.1 to 5 parts of cellulose acyl esters and mixed acyl alkyl esters,
   (F) from about 0.3 to 3 parts of handle-improving agents comprising a member selected from the group consisting of long-chain, saturated fatty acid amides; long-chain, unsaturated fatty acid amides; long-chain, saturated fatty acid esters; long-chain, unsaturated fatty acid esters; finely disperse polyolefins; finely disperse polyacrylates; finely disperse polyamides; and finely disperse terepthalic acid esters,
   (G) from about 0.1 to 3.5 parts of polydimethyl siloxanes, hydroxy alkyl polydimethyl siloxanes or polyether silicones and
   (H) from 0 to about 20 parts of pigments, fillers and stabilizers.

* * * * *